United States Patent
Gupta et al.

(10) Patent No.: US 8,185,135 B2
(45) Date of Patent: *May 22, 2012

(54) WIFI AND GSM LANDMARKS AND NEIGHBORHOODS FOR LOCATION BASED SERVICES

(75) Inventors: Mohit Gupta, Berkeley, CA (US); Prashanth Mohan, Karnataka (IN); Lenin Ravindranath Sivalingam, Tamilnadu (IN); Santhosh Kumar, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/172,706

(22) Filed: Jun. 29, 2011

(65) Prior Publication Data

US 2011/0256853 A1    Oct. 20, 2011

Related U.S. Application Data

(63) Continuation of application No. 12/238,361, filed on Sep. 25, 2008.

(51) Int. Cl.
*H04W 24/00* (2009.01)
(52) U.S. Cl. ............... 455/456.3; 455/456.1; 455/414.2; 455/456.6
(58) Field of Classification Search .................. None
See application file for complete search history.

(56) References Cited

U.S. PATENT DOCUMENTS

| | | | |
|---|---|---|---|
| 7,317,705 B2 | 1/2008 | Hanson | |
| 2005/0117781 A1 | 6/2005 | Aoyama | |
| 2006/0265491 A1 * | 11/2006 | Litwin | 709/224 |
| 2007/0060130 A1 * | 3/2007 | Gogic et al. | 455/440 |
| 2007/0083428 A1 | 4/2007 | Goldstein | |
| 2007/0217427 A1 | 9/2007 | Chung | |
| 2008/0032666 A1 | 2/2008 | Hughes et al. | |
| 2008/0034088 A1 | 2/2008 | Suresh | |
| 2008/0064393 A1 | 3/2008 | Oommen et al. | |
| 2008/0117850 A1 | 5/2008 | Agrawal et al. | |
| 2008/0268816 A1 | 10/2008 | Wormald | |
| 2009/0024550 A1 * | 1/2009 | Wynn et al. | 706/46 |
| 2009/0132941 A1 | 5/2009 | Pilskalns | |
| 2009/0163228 A1 | 6/2009 | Blumberg et al. | |
| 2009/0175239 A1 | 7/2009 | Grinshpun et al. | |
| 2009/0254975 A1 | 10/2009 | Turnbull et al. | |
| 2009/0322517 A1 | 12/2009 | Kalasapur et al. | |

(Continued)

OTHER PUBLICATIONS

Hightower, et al.; "Location Systems for Ubiquitous Computing"; Retrieved at <<http://www.intel-research.net/seattle/pubs/062120021154_45.pdf>>; Aug. 2001; pp. 57-66.

(Continued)

*Primary Examiner* — Ajit Patel

(57) ABSTRACT

A system for capturing and delivering location-based information and services captures wireless landmark information sent by mobile devices to build a map of locations based on the relationship between wireless landmarks that are visible to the mobile device at the same time. A wireless landmark may be a cellular telephone base site or local network (WiFi/Bluetooth) access point. The mobile device may capture a location signature using identifiers for all wireless local area networks in range as well as one or more cellular telephone transmitters. A location service resolves the location signature into a relative location that an application service may use to record incoming information or to send location-specific information such as traveler comments, reviews, or advertisements. The distance between two mobile devices may be calculated using weighted edge values, representing a number of 'hops' between location signatures.

20 Claims, 5 Drawing Sheets

U.S. PATENT DOCUMENTS

| | | | |
|---|---|---|---|
| 2010/0075697 A1 | 3/2010 | Gupta | |
| 2010/0268717 A1 | 10/2010 | Pilskalns | |
| 2011/0047603 A1* | 2/2011 | Gordon et al. | 726/5 |
| 2011/0191253 A1 | 8/2011 | Pilskalns | |

OTHER PUBLICATIONS

Guedes, Filipe; "Co-Location of Mobile Devices with Audio and Wireless Interfaces"; Retrieved at <<http://paginas.fe.up.pt/~ee01154/project/docs/progress.report.ee01154.pdf>>; Nov. 29, 2007; pp.1-4.

LaMARCA, et al.; "Self-Mapping in 802.11 Location Systems";l Retrieved at <<http://www.intel-research.net/seattle/pubs/100620061658_353.pdf>>; ACM International Conference on Ubiquitous Computing; 2005; pp. 18.

Marmasse, et al.; "Location-Aware Information Delivery with Commotion"; Retrieved at <<http://alumni.media.mit.edu/~nmarmas/cmHUC2k.pdf>>; HUC 2000 proceedings; pp. 157-171.

Bappu, et al.; "Location Based *ad hoc* Message Propagation Using Wi-Fi and 2G/3G Networks"; Retrieved at <<http://www.theitp.org/UserData/root/Files/2007Vol6Prt2_02.pdf>>; The Journal of the Communications Network; vol. Part 2; Apr.-Jun. 2007; pp. 12-18.

Marias, et al.; "An Innovative Gateway for Indoor Positioning"; Retrieved at <<http://www.hindawi.com/GetPDF.aspx?doi=10.1155/ASP/2006/81714>>; EURASIP Journal on Applied Signal Processing; vol. 2006; Article ID 81714; pp. 1-10.

Ashbrook, et al.; "Using GPS to Learn Significant Locations and Predict Movement Across Multiple Users"; *Personal and Ubiquitous Computing*, Vol. 7, No. 5, Oct. 2003; pp. 275-286.

Bahl, et al.; "RADAR: An Inbuilding RF-Based User Location and Tracking System"; <<http://research.microsoft.com/~padmanab/papers/infocom2000.pdf>>; Mar. 26-30, 2000; pp. 10.

Chen, et al.; "Practical Metropolitan-Scale Positioning for GSM Phones"; <<http://www.stanford.edu/~haehnel/papers/100920061625_366.pdf>>; Ubicomp 2006; LNCS 4206; 2006; pp. 225-242.

Cui, et al.; "Autonomous Vehicle Positioning with GPS in Urban Canyon Environments"; <<http://vlab.ee.nus.edu.sg/~sge/conference/ICRA01-1.pdf>>; Proceedings of the 2001 IEEE; International Conference on Robotics & Automation; Seoul, Korea; May 21-26, 2001; pp. 1105-1110.

Espinoza, et al.; "GeoNotes: Social and Navigational Aspects of Location-Based Information Systems"; <<http://www.sics.se/~espinoza/documents/GeoNotes_ubicomp_final.htm>>; UBICOMP 2001; Sep. 30-Oct. 2, 2001; Atlanta, Georgia;; pp. 10.

LaMarca, et al.; "Place Lab: Device Positioning Using Radio Beacons in the Wild"; <<http://www.placelab.org/publications/pubs/pervasive-placelab-2005-final.pdf>>; 2005; pp. 18.

Hightower et al.; "Learning and Recognizing the Places We Go"; <<http://www.intel-research.net/seattle/pubs/100220060925_330.pdf>>; ACM International Conference on Ubiquitous Computing, 2005; pp. 18.

Johnson, Donald B.; "Efficient Algorithms for Shortest Paths in Sparse Networks"; <<http://delivery.acm.org/10.1145/330000/321993/p1-johnson.pdf?key1=321993&key2=612757121&coll=GUIDE&dl=GUIDE&CFID=39080977&CCFTOKE=95720422>>; Journal of the Association for Computing Machinery; vol. 24, No. 1; Jan. 1977; pp. 1-13.

Krumm, et al.; "The NearMe Wireless Proximity Server"; <<http://research.microsoft.com/users/kenh/papers/NearMe.pdf>>; The Sixth International Conference on Ubiquitous Computing; UbiComp 2004; Sep. 7-10, 2004; Nottingham, England; pp. 283-300.

Otsason, et al.; "Accurate GSM Indoor Localization"; <<http://www.placelab.org/publications/pubs/ubicomp2005-indoorGSM.pdf>>; UbiComp 2005; LNCS 3660; 2005; pp. 141-158.

Schilit, et al.; "Context-Aware Computing Applications"; <<http://sandbox.xerox.com/want/papers/parctab-wmc-dec94.pdf>>; IEEE Workshop on Mobile Computing Systems and Applications, Dec. 8-9 1994; pp. 1-7.

Smith, Marc A.; "Some Social Implications of Ubiquitous Wireless Networks"; <<http://delivery.acm.org/10.1145/370000/367049/p25-smith.pdf?key1=367049&key2=2532757121&coll=GUIDE&dl=GUIDE&CFID=80443965&CFTOKEN=41566866>>; Mobile Computing and Communications Review; vol. 4, No. 2; Apr. 2000; pp. 25-36.

Varshavsky, et al.; "Are GSM Phones the Solution for Localization?"; <<http://www.intel-research.net/seattle/pubs/100620061635_346.pdf>>; HotMobile; 2006; pp. 6.

\* cited by examiner

WIFI AND GSM LANDMARKS AND NEIGHBORHOODS FOR LOCATION BASED SERVICES

CROSS-REFERENCE TO RELATED APPLICATIONS

This patent application is a continuation of, and claims priority from, U.S. patent application Ser. No. 12/238,361 filed on Sep. 25, 2008, which is incorporated herein by reference in its entirety.

BACKGROUND

The introduction of low-cost global positioning system (GPS) units has given rise to a number of location-based services, particularly those that carry a database of points of interest by their map location. The database for an entire country can be stored in the unit and the information retrieved by map location, whether the unit is at that location or not. The database is contained in the GPS unit and may be updated periodically while the GPS unit is connected to an online service, for example, via the Internet while connected to a host computer.

Location-based information systems, however, position the actual data based on location so that notes, blogs, advertisements, and nearby people are made available as a location aware device traverses an area.

However, accurate location information can be difficult to acquire, particularly when in urban canyons or indoors, when using devices without GPS units, or without access to "war driving" databases, that is, a database of WiFi sites noting location by network.

SUMMARY

A system for developing and using location information collects information at a server to map wireless landmarks such as cell phone sites and WiFi wireless access points by wireless identifier, as opposed to network name. When a WiFi access point fall within a GSM coverage area, an association may be made between the two regions. Additional WiFi access points may be mapped in relation to known access points and known GSM coverage areas. When in a geographic area, a mobile device location can be identified by the signature of the combination of one or more WiFi access points and the current GSM area that are currently visible. GSM and WiFi access point edges are weighted to account for their relative coverage areas when building the mapping relationships.

While actual geographic locations (e.g. latitude and longitude) may be developed, the system may rely on the relative relationships between wireless landmarks more than their absolute location. Such a system may be easier to deploy because only radio landmark relationships may be recorded without the need for specific geographic (e.g. latitude/longitude) references.

The mapping does not require 'war driving' in that locating vulnerable WiFi networks are not required, although war driving data can be used to enhance the wireless landmark relationship network. Because any WiFi access point (AP) will respond with an AP identifier (basic service set identifier or BSSID) when queried, an AP may be cataloged even when connection to its associated network is not allowed.

When accessing location-based data in either a push or pull mode, the mobile device may send a wireless signature of all 'visible' wireless landmarks for use by a location service. The location service may resolve the wireless signature to a location and the location may be passed to an application service for geo-located information. The geo-located information may include web logs (blogs), points of interest, reviews, advertising, or even social networking 'friends' in the vicinity. Some or all such services may be 'opt-in' for personal privacy reasons. In another location-sensitive application, gamers looking for another game partner may be identified by proximity.

The combination of GSM and WiFi in this manner uses less power than GPS solutions and works well in urban canyons. Deployment does not require wireless system operators to change their networks, or even cooperate in the mapping process. While the absolute location, e.g. latitude and longitude, of the wireless landmarks may be cataloged, many of the location-based applications may require only relative location information. For example, a location-based 'sticky note' may not require any sense of its absolute location, only that it can be found where it was left.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
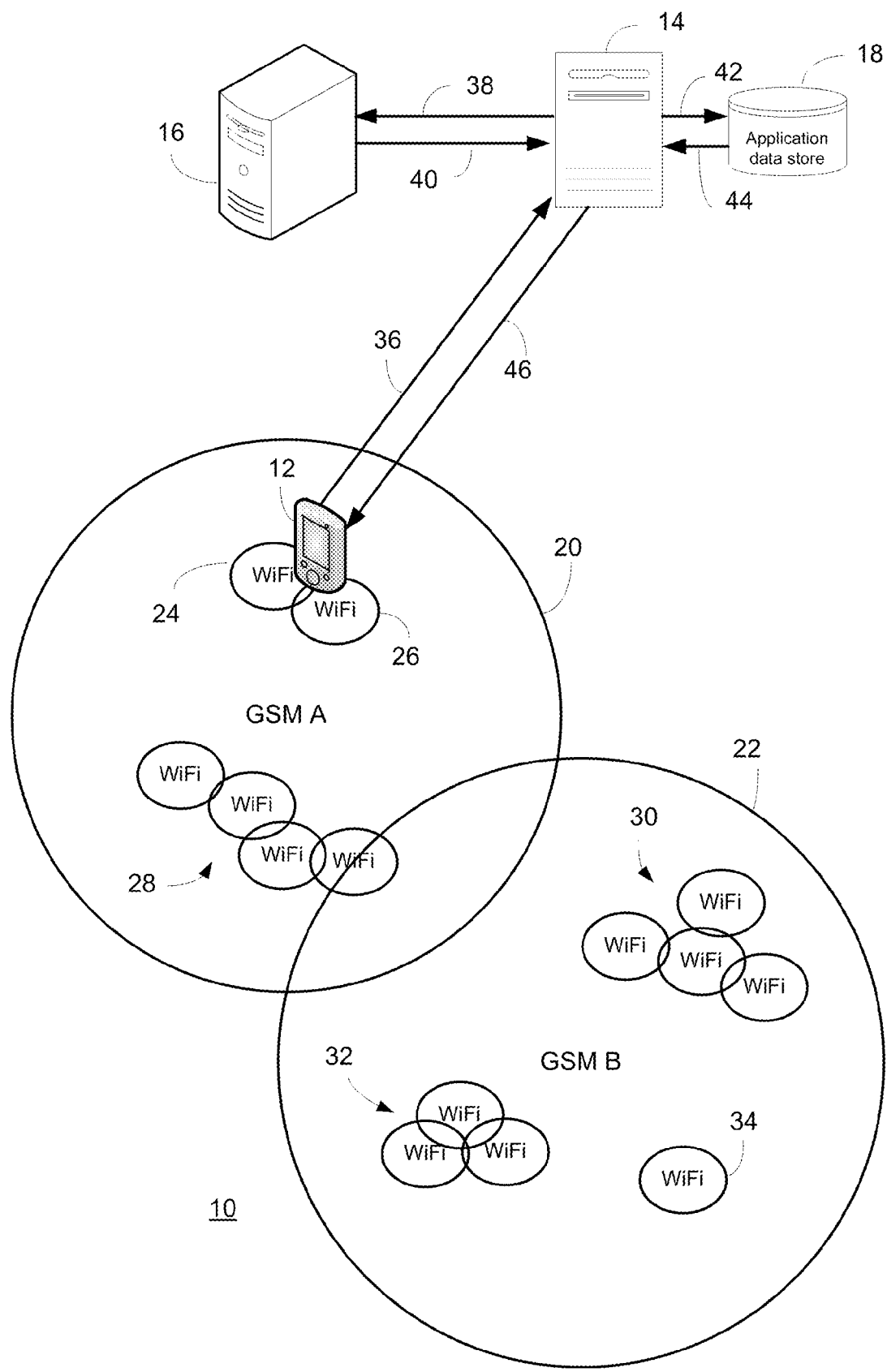
FIG. 1 is a block diagram of a system for capturing and providing location-based application data.

FIG. 1 illustrates a simplified and representative system 10 for capturing and providing location-based application data. A mobile device 12 may be capable of supporting wireless connections using multiple protocols supporting both cellular networks and local wireless networks. For example, such protocols for cellular networks may include CDMA cellular networks and its related variations as well as GSM cellular networks and its related variations, to name a few. Such networks typically have a single cell coverage areas measured in kilometers (e.g., 0.5 kilometers to 1.5 kilometers, in some settings, although variations outside this range exist based on terrain and mobile device density). For the purpose of this patent, a local wireless network includes 802.11 wireless networks in all its formats (e.g. A, B, G) also known as WiFi; Bluetooth, Infrared, etc., typically having a range of several meters to tens of meters, although variations beyond this range exist as well.

For the purpose of this patent, a visible wireless landmark means a cellular site or local wireless network access point that is in-range and capable of being identified by site-specific indicia. Recently in range wireless landmarks may also be included as visible in some cases.

The mobile device 12 may be in logically connected, or accessible to, back-end equipment such as an application server 14, which itself may be connected to a location server 16 and an application data store 18. The mobile device 12 may be in coverage of a first cellular network, GSM A 20, and near a second cellular network, GSM B 22. The mobile device 12 may have visibility to two WiFi network access points 24 and 26. Other nearby WiFi 'hot spots' may include WiFi clusters 28, 30, and 32, and a single site 34.

The mobile device 12 may be a cellular telephone, a personal digital assistant, a smart phone, etc. The mobile device may include a GPS receiver, but such equipment is not required.

The application and location servers 14 and 16 may be commercially available computers/servers and the application data store 18 may be a standalone storage facility, or may be incorporated in one of the servers. It will be appreciated that may configurations of the back-end equipment are possible, including both location and application functions being served from a single computer. Other configurations may include the application and/or location serving functions being spread across multiple servers, including different geographic regions depending on cost and response requirements.

In operation, a user of the mobile device 12 may wish to tag a location for future reference, either as a note to herself or as a note to others who may follow. The note may be generated on the mobile device 12. Periodically, or in response to the action to generate the note, the mobile device 12 may take an inventory of all available wireless networks/access points that are visible. As illustrated in FIG. 1, the mobile device is in range of GSM A 20, and WiFi regions 24 and 26. Even if the mobile device 12 is not connected to either of the WiFi networks 24 or 26, the BSSID (or similar identifier) may be collected from the respective access points.

The identities wireless landmarks, GSM A 20 site and the two WiFi access points, may be formulated into a wireless signature and forwarded with the note and, in some cases, an action to be taken. The action to be taken may be to post a public note, to post a note restricted to authorized users, or to post a private note, accessible only to the person who created it.

The wireless signature, note, and action (or equivalent information) may be forwarded to the application server 14 over network path 36. The application server 14 may strip out the wireless signature and forward it to the location server 16 via message 38. The location server 16 may use the wireless signature to confirm existing location data or to build out new relationship data about the elements found in the wireless signature. A graph, depicted in FIG. 2 may be used to catalog relationships about known wireless landmarks.

The location server 16 may return location information in the form of a logical location as well as logical distances to other locations on return path 40. The application server 14 may then use the location information as an index to store the note via path 42 onto the data store 18. If requested, the application server 14 may also use the location information to retrieve location-specific data from the data store 18 via path 44 and formatted by the application server 14 to send to the mobile device via return path 46.

The location-specific data may be in several broad categories. The first may be 'fixed' data associated with the location, such as sticky notes or photos left previously by the same user, sticky notes or photos left by others, blog spaces, reviews, or paid advertising. The second may be information about others in proximity about whom the user may be interested. In one embodiment, the proximity information may be used to find social networking friends in the area. In another embodiment, the proximity information may be used to avoid contact with undesired persons. Such cases may arise in the case of a protective order where one person is to stay away from another. In this case, a warning may be returned to the mobile device and, optionally, an alert may be sent to the local authorities advising of a potential violation of the protective order. Unlike prior art monitoring systems, this mechanism works on the protected person's location, not just the person's residence or place of business. Proximity calculations using edge values is illustrated in FIG. 2.

Figure 2:
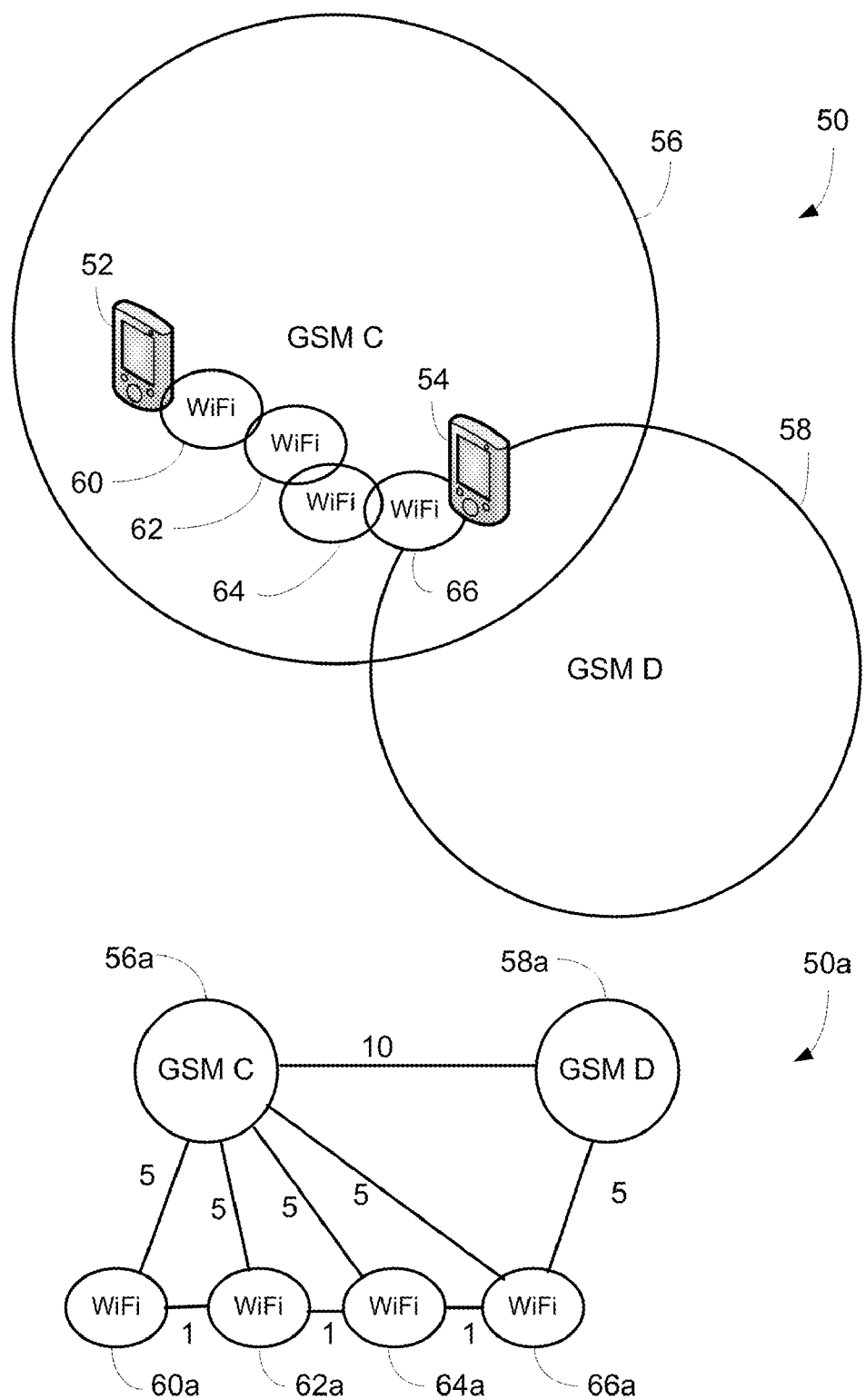
FIG. 2 is block diagram illustrating proximity approximation using edge weights.

FIG. 2 shows a representative physical layout 50 of wireless landmarks and a corresponding graph 50a. Two mobile devices, 52 and 54, are illustrated. Cellular networks GSM C 56 and GSM D 58 are shown with overlapping coverage regions. Four WiFi access points 60, 62, 64, 66 are also present and overlap the coverage area for GSM C 56, while only WiFi access point 66 has an overlap with the coverage area of GSM D 58.

The graph 50a representing the logical relationships between radio landmarks shows that GSM C 56a is connected to each of the other radio landmarks, while GSM D 66a is connected to only GSM C 56a and WiFi access point 66a.

In calculating the relative distance between the two mobile devices 52 and 54, each edge traversed can be assigned a value and all possible traversal paths calculated to find the lowest value path.

In this illustration, cellular-cellular edges may be assigned a value of 10 while WiFi-cellular may be assigned a value of 5 and WiFi-WiFi given a value of 1. To calculate the logical distance from WiFi 60a to WiFi 66a, three paths may be calculated:

1: 60a-56a-58a-66a=5+10+5=20
2: 60a-56a-66a=5+5=10
3: 60a-62a-64a-66a=1+1+1=3

The shortest logical distance is option 3, with a value of 3. Various applications may use this shortest logical distance as a trigger for activation. For example, a 'friend finder' application may notify a user of all friends within a range of 4. Alternatively, a user may be able to set preferences for different applications depending on either the circumstances or the location. For example, a user going to the grocery store before preparing dinner may set the distance to zero (i.e., don't bother me), while a user visiting a foreign country may set the distance to 30 or more.

Figure 3:
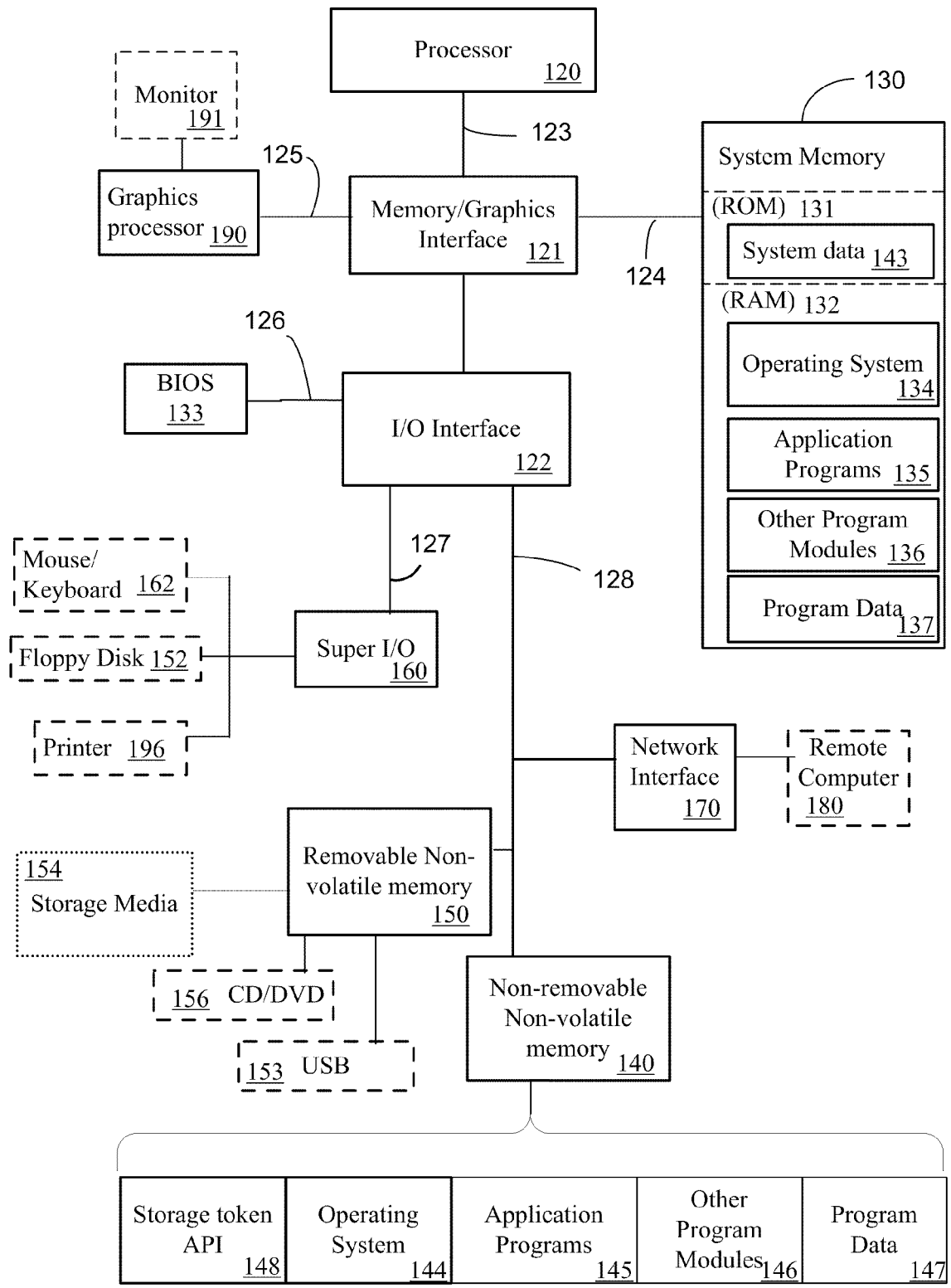
FIG. 3 is a block diagram representative of a computer that may support fixed-side operations.

With reference to FIG. 3, an exemplary system for implementing the claimed method and apparatus includes a general purpose computing device in the form of a computer 110. Components shown in dashed outline are not technically part of the computer 110, but are used to illustrate the exemplary embodiment of FIG. 3. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 3 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect—Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 3 illustrates a hard disk drive 140 that reads from or writes to non-removable, nonvolatile magnetic media. The hard disk drive 140 may be a conventional hard disk drive or may be similar to the storage media described below with respect to FIG. 2.

Removable media, such as a universal serial bus (USB) memory 153, firewire (IEEE 1394), or CD/DVD drive 156 may be connected to the PCI bus 128 directly or through an interface 150. A storage media 154 similar to that described below with respect to FIG. 2 may coupled through interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 3, provide storage of computer readable instructions, data structures, program modules and other data for the computer 110. In FIG. 3, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 3 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110, or in the specific case of location-based applications may be a location server or an application server.

In some embodiments, the network interface may use a modem (not depicted) when a broadband connection is not available or is not used. It will be appreciated that the network connection shown is exemplary and other means of establishing a communications link between the computers may be used.

Figure 4:
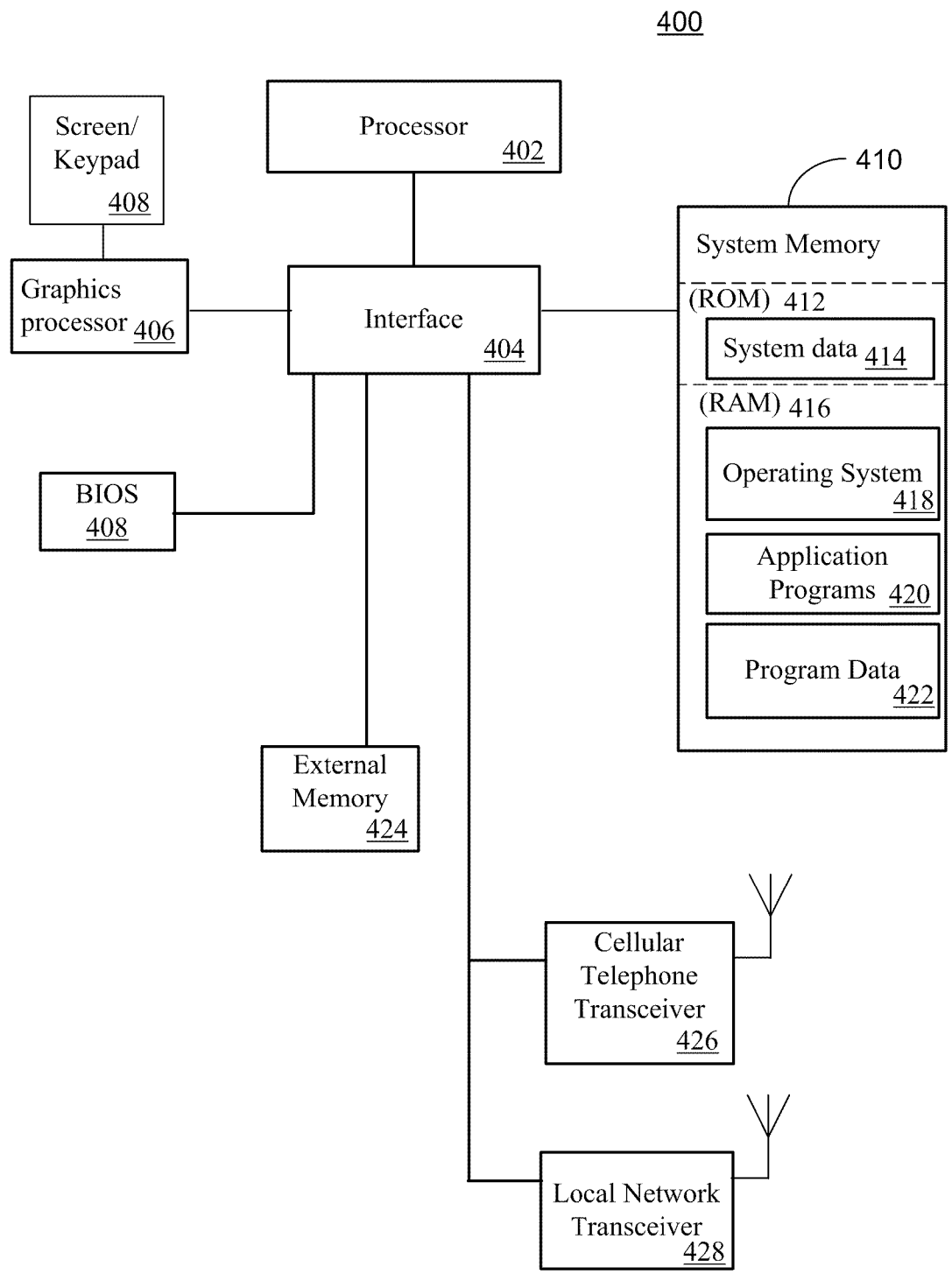
FIG. 4 is block diagram representative of a mobile device suitable for use in a location-based application.

FIG. 4 is a block diagram of a representative mobile device 400, such as mobile device 12 of FIG. 1. The mobile device 400 may include a processor 402, an interface circuit or circuits 404 and a number of peripheral connections and memory. A graphics processor 406 may support user interface functions such as a screen/keypad 408. In some embodiments, a basic input/output system (BIOS) 408 may support initial operation of the mobile device 400. A system memory 410 may include read-only memory 412 that may also include system data 414 in firmware such as operator settings, etc. Random access memory 416 may store working copies of the operating system 418 (if present), application programs 420, and program data 422. An external, removable memory 424 may be used to store pictures, etc.

To support the embodiment described, more than one wireless protocol may be supported by the mobile device 400. In this example, a cellular telephone transceiver 426 may be resident with local network transceiver 428. As discussed above, the local network transceiver 428 may include support for a WiFi network, Bluetooth, Infrared, etc. In other embodiments, especially as technology develops, it is envisioned that one device may simultaneously support each of the various wireless protocols employed by the mobile device 400. For example, a software-defined radio may be able to support multiple protocols via downloadable instructions.

In operation, the mobile device 400 may be able to periodically poll for visible wireless network transmitters (radio landmarks), both cellular and local network types on a periodic basis. Such polling may be possible even while normal wireless traffic is being supported on the mobile device. After polling to determine visible radio landmarks, the information may be formatted with other information, when available, and sent to an application service or location service. Because voice/data connections are not necessarily required to determine the presence of radio landmarks, no equipment changes to the radio landmarks are required, and in fact, no permission or access to those networks are required. Because the landmark relationships are primarily used and not their absolute geographic locations, physical scouting and mapping are also not required, although as such information is available, it may easily be incorporated, if desired.

Figure 5:
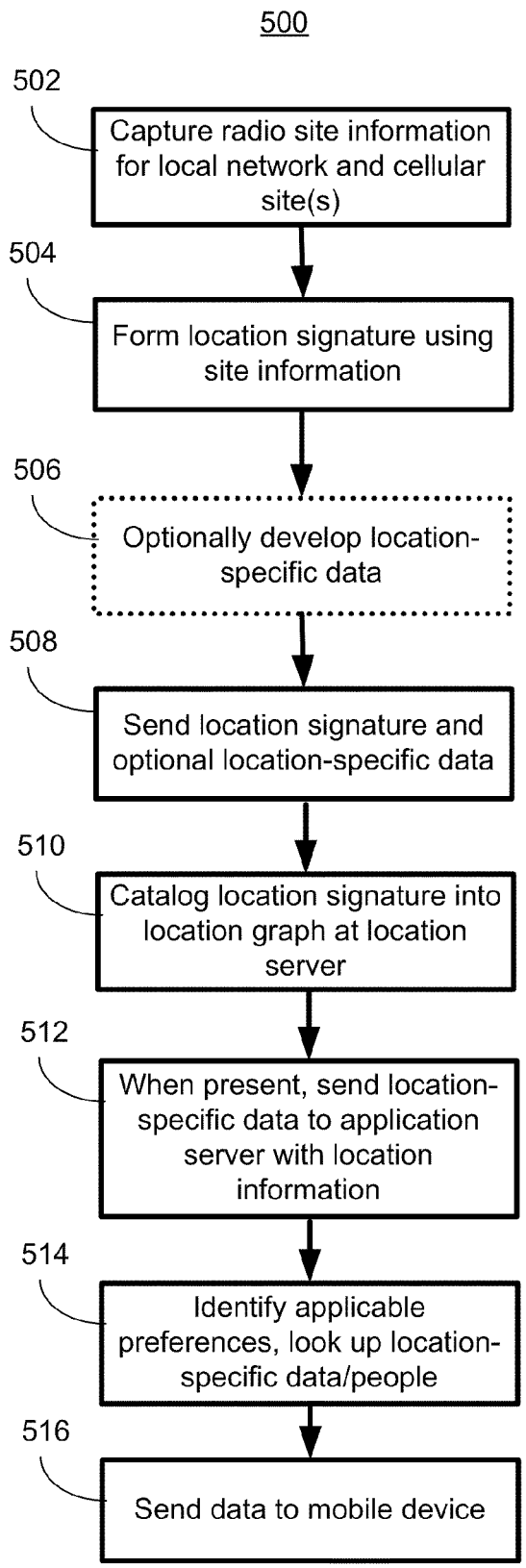
FIG. 5 is a flow chart illustrating a method of using capturing location-based application data.

FIG. 5 is a flow chart of a representative method of delivering location-based information to a mobile device. At block 502, a mobile device 12 may capture visible cellular telephone base site information. In some cases, mobile devices may not be able to poll available base stations, so only the currently registered base site identifier may be available. Other mobile devices may allow base site polling so that the mobile device 12 can report more than one cellular site. Signal strength indications may be recorded as well, but early testing suggests that signal strength by itself is not a reliable tool for location inferences.

The mobile device 12 may also collect visible local wireless site information. The local wireless sites may include 802.11 local area networks, Bluetooth networks, etc. Because many local wireless networks allow polling to determine what networks are visible, the mobile device 12 may collect access point identifiers for numerous access points.

At block 504, the cellular telephone and local wireless network information may be formatted into a location signature. The location signature may include as many radio landmarks, e.g. cellular telephone site identifiers and local wireless networks, as are available, but may also include signal strength and GPS data, as available. In some cases, previously logged radio landmarks may also be included. For example, if radio landmark surveys are taken every 30 seconds, radio landmarks noted in the last two logging cycles may also be included. This may be the case when there is a low density of radio landmarks.

At block 506, location-specific data may be optionally developed. For example, a user may take a photograph from the location, the user may write a note about the location or a review of a local establishment. The user may respond to a previously retrieved note about the location. The location-specific data may be tagged as to its use. For example, the information may be set to private, so only the user can retrieve it, it may be set to friends, where known parties can access it, or it may be set to public, so that anyone can see it. A location perimeter may also be set, so that the exactness with which the location must be duplicated can be set. Certainly numerous other options exist for both the type of data developed and the accessibility settings.

At block 508, the location signature and any optional location-specific data may be sent to the infrastructure supporting the application, such as an information service or application service. In one embodiment, the architecture of FIG. 1 may be used, but other configurations of equipment may serve equally well.

At block 510, a location server, such as location server 16 of FIG. 1 may process the location signature into a logical location, and depending on the data available, to a physical location as well. The location server 16 may begin by analyzing all the radio landmarks in the current location signature. If a new radio landmark is present, it may be mapped according to its previously known neighbors. New radio landmarks are easy enough to identify. However, a new landmark may need to meet a threshold number of reports before it is added, to weed out other mobile devices that may represent 'false,' e.g. moving, radio landmarks.

Of perhaps more interest is the process for pruning dead or moved radio landmarks. The following formula may be used to monitor the health of current radio landmarks.

$$\frac{N_{AB}}{N_A + N_B}$$

where A and B are specific radio landmarks, $N_{AB}$ is the total number of times A and B are reported together in the same location signature and $N_A$ and $N_B$ are the number of times either radio landmark is reported. As can be seen, when the number of reports of the two in the same signature falls, or if both locations are reported separately, a reliability metric will fall and the offending location may be dropped.

At block 512, when enough data is present in the location database, a response to a requesting application may be returned to the requesting application. If data received from the user included location-specific information, such information may be added to the location database and appropriate privacy settings applied, according to user preferences. Depending on the nature of the application, more information about the logical location may be requested. For example, in a "friend finder" application, the location server may be asked to identify all the other logical locations within a radius preference set by the user. Using the example of FIG. 2, a request may include a request for all logical locations within a given number of points of the current logical location. When geographic information is available, latitude and longitude or street address may also be developed and returned. If the location database is sparsely populated, meaningful radio landmark relationships may not yet exist beyond those available from the location signature itself. Over time, as other location signatures are received the logical map will allow new and expanded relationships to be identified.

At block 514, the information service may retrieve applicable preferences and application data related to previous notes, location-specific blog spaces, acquaintances, advertisements, etc. In one embodiment, the information service may request advertising from a commercial ad server using either location information, key words, or other criteria as advertising keys.

At block 516, the location-specific information, including advertisements, may be returned to the mobile device 12 for consideration by the user. Again, depending on preferences and personal privacy policies, the lists of acquaintances, either desired or undesired, may be returned to the user or to desired 'friends.'

In another embodiment, the information service may observe when two or more mobile devices travel through a pattern of radio landmarks in unison over a given period of time. The information service may infer a friendship there and ask the user if there are others to be added to a friends list. In one scenario, the traveling partners may be recognized and the new "friends" given appropriate status. In another scenario, one person may not realize another person has been traveling the same path. If this is not desired, the person may increase awareness, report the incident, or take other steps as necessary.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A system comprising:
a mobile device configured to:
collect visible cellular telephone base site information at the mobile device;
collect visible local wireless site information at the mobile device;
format the visible cellular telephone base site information and the visible local wireless site information into a location signature;
send the location signature from the mobile device to an information service; and
receive location-based application data corresponding to the location signature.

2. The system according to claim 1, further comprising the information service.

3. The system according to claim 2, the information service comprising an application server located remotely from the mobile device.

4. The system according to claim 1, the location signature identifying a logical location of the mobile device.

5. The system according to claim 4, the location-based application data comprising an advertisement associated with the logical location of the mobile device.

6. The system according to claim 4, the location-based application data comprising a note associated with the logical location, the note having previously been left at the logical location by another mobile device.

7. The system according to claim 4, the location-based application data comprising a photo, blog space, or review associated with the logical location, wherein the photo, the blog space, or the review were previously left at the logical location by another mobile device.

8. The system according to claim 4, the location-based application data identifying a social networking friend of a user of the mobile device when the social networking friend is in proximity of the logical location of the mobile device.

9. The system according to claim 4, further comprising a friend finder application configured to notify the user of friends that are within a user-configurable range of the logical location of the mobile device.

10. The system according to claim 1, wherein the mobile device is configured to collect the visible local wireless site information for local wireless sites that the mobile device does not have permission to access.

11. The system according to claim 1, wherein the mobile device is configured to collect the visible cellular telephone base site information for cellular telephone base sites that the mobile device does not have permission to access.

12. A system comprising:
a location server configured to:
receive location signatures generated by mobile devices, the location signatures including wireless landmark information for wireless landmarks including cellular telephone sites and local network sites;
assign edge values to pairs of the wireless landmarks that are received together in the location signatures;
generate a map of the wireless landmarks using the pairs of the wireless landmarks that are received together in the location signatures, the map being generated using the edge values to determine logical distances between the cellular telephone sites and the local network sites;
receive a first location signature from a first one of the mobile devices; and
return, to the first mobile device, a location reflecting first logical distances of the first mobile device from at least some of the wireless landmarks.

13. The system according to claim 12, further comprising the first mobile device.

14. The system according to claim 12, the location being returned to the first mobile device via an application server.

15. The system according to claim 12, the first logical distances comprising shortest distances among possible traversal paths from the first mobile device to a remainder of the mobile devices.

16. The system according to claim 12, the edge values being weighted according to relative coverage areas of the wireless landmarks.

17. A method comprising:
 accessing cellular telephone base site information reflecting one or more cellular telephone base sites that are visible to a mobile device;
 accessing local wireless site information reflecting one or more local wireless sites that are visible to the mobile device;
 providing the cellular telephone base site information and the local wireless site information to a location service that determines a location of the mobile device based on the cellular telephone base site information and the local wireless site information; and
 processing location-based application data that is associated with the location of the mobile device determined by the location service.

18. The method according to claim 17, the location service being located remotely from the mobile device.

19. The method according to claim 17, performed by the mobile device.

20. One or more computer memory devices or storage devices comprising instructions which, when executed by one or more processors, cause the one or more processors to perform the method of claim 17.

* * * * *